| SETTING | HIGH SP FAN | LOW SP FAN | VENT. SOL. | EXH. SOL. | COMPR. | SWITCH A | SWITCH B | SWITCH C | SWITCH D | SWITCH E |
|---|---|---|---|---|---|---|---|---|---|---|
| HIGH | ON | OFF | ON | OFF | OFF | OPEN | CLOSED | OPEN | OPEN | OPEN |
| LOW | OFF | ON | ON | OFF | OFF | CLOSED | OPEN | OPEN | OPEN | OPEN |
| COOLING | ON | OFF | OFF | OFF | ON | OPEN | OPEN | OPEN | CLOSED | CLOSED |
| EXHAUST | ON | OFF | OFF | ON | OFF | OPEN | OPEN | CLOSED | OPEN | OPEN |
| OFF | OFF | OFF | OFF | OFF | OFF | OPEN | OPEN | OPEN | OPEN | OPEN |

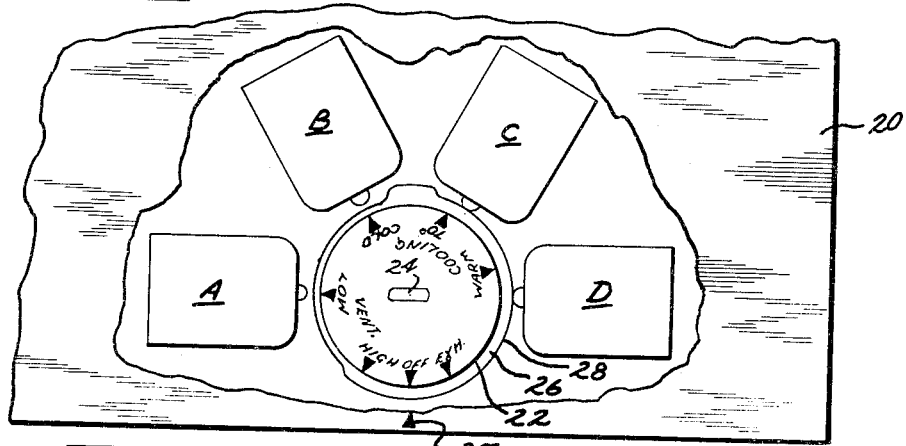
Fig. 1
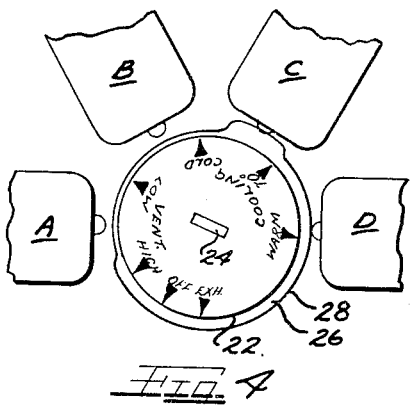
Fig. 4
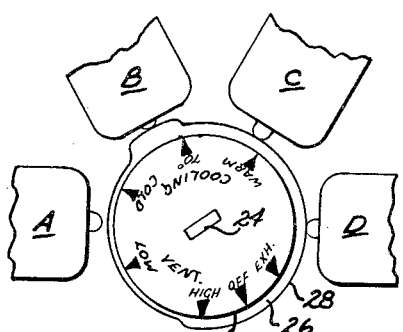
Fig. 5
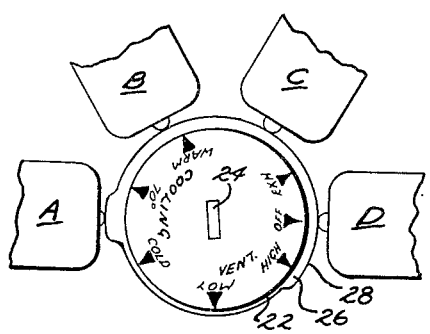
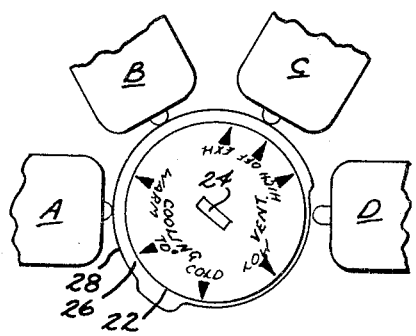
Inventors
THOMAS B. LEGEZA
EDWARD E. MODES

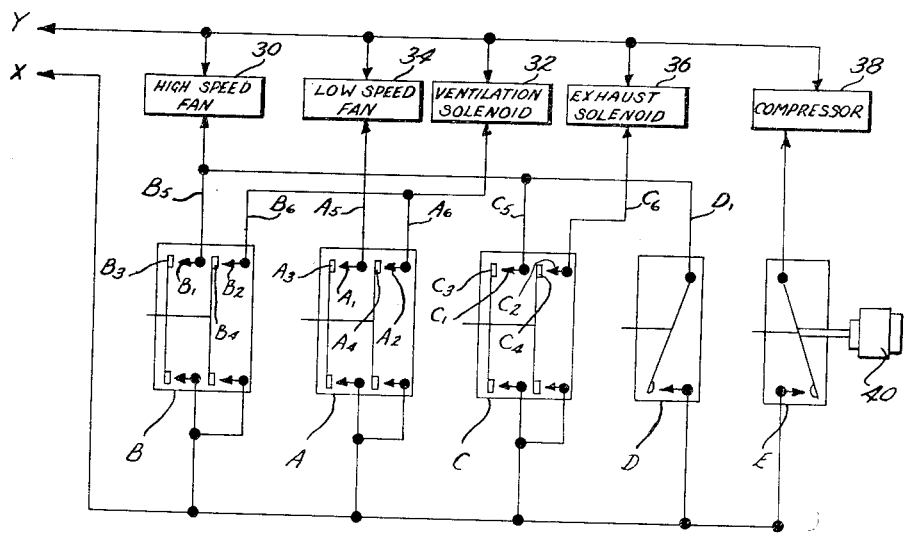

Inventors
THOMAS B. LEGEZA
EDWARD E. MODES

*Inventors*
THOMAS B. LEGEZA
EDWARD E. MODES

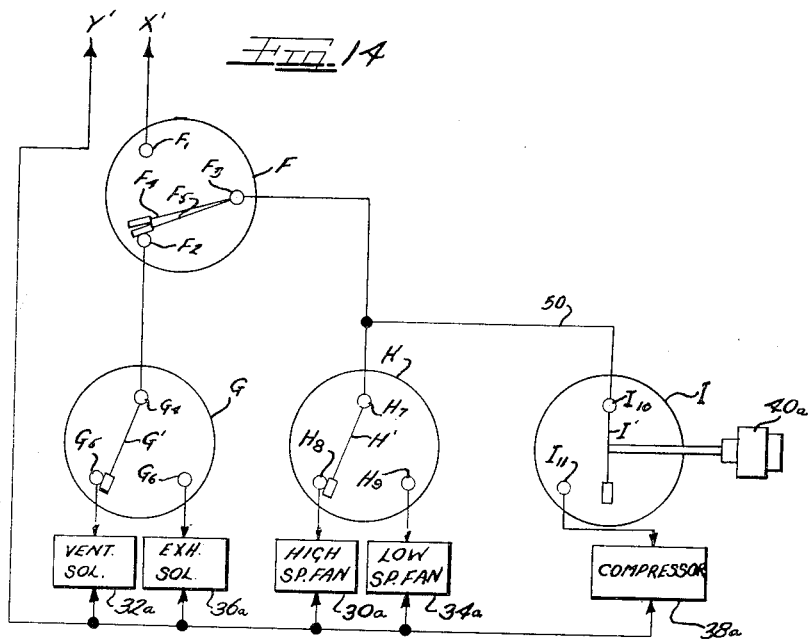

United States Patent Office 2,778,197
Patented Jan. 22, 1957

2,778,197
ROOM AIR CONDITIONER CONTROL CIRCUIT

Thomas B. Legeza, Westchester, and Edward E. Modes, Chicago, Ill., assignors to The Dole Valve Company, Chicago, Ill., a corporation of Illinois Application December 19, 1955, Serial No. 554,091

5 Claims. (Cl. 62—4)

This invention relates to an electric control system particularly useful in controlling the operation of various operating means in a room air conditioning system.

Normally, room air conditioners are provided with means adapted to perform several distinct and separate functions. These functions include: ventilating the room by outside air blown in by a fan means of the conditioning unit; cooling, which ordinarily includes de-humidifying, air passing through the conditioning unit; and exhausting stale or otherwise objectionable air from the room through the conditioning unit to the atmosphere. Different conditions of temperature and humidity of the outside air, conditions of the inside air, and the desired temperature and humidity of the inside air, etc., require that the air conditioning unit be adapted to be selectively controlled to cause it to perform its different functions selectively at the will of the operator. Yet, the control means must be relatively simple and unconfusing even to an opeartor who may be relatively unskilled in the use of mechanical instruments or of their controls. Moreover it is desirable that ease of control be provided without any bulky or expensive control interlock system.

It is accordingly, an object of the present invention to provide an electric control system by which high-speed ventilation, low-speed ventilation, exhaust, and cooling operation of an air conditioning system may be manually controlled through the selective positioning of a single control knob.

Another object of the present invention is the provision of a control system for an air conditioning unit, which will be simple to operate and is of a simple and economical construction and assembly.

These and other objects, features, and advantages of the present invention, with relation to a general and specific improvement of control systems for air conditioning units, will be readily apparent from the following description of certain preferred embodiments thereof, taken in conjunction with the accompanying drawings, in which:

Figure 1 is a front elevational view, somewhat diagrammatic, of a portion of the cabinet of a room air conditioning unit embodying the present invention according to a preferred embodiment, and with portions of the front panel of the cabinet broken away to show the control system, the control being set to provide an "off" or inoperative condition of the ventilating means, cooling means, and exhaust means.

Figure 2 illustrates the control system adjusted to provide "exhaust" condition;

Figures 3 and 4 illustrate the parts positioned to provide conditions of "high ventilation" and "low ventilation," respectively;

Figure 5 illustrates the control system with the parts positioned to provide a "cooling" condition;

Figure 6 is a schematic diagram of the control system;

Figure 7 is a table indicating the conditions of the functional features of the air conditioning unit and indicating the condition of the several switch means in the control therefore, as determined by any of the various possible settings of the control;

Figure 12:
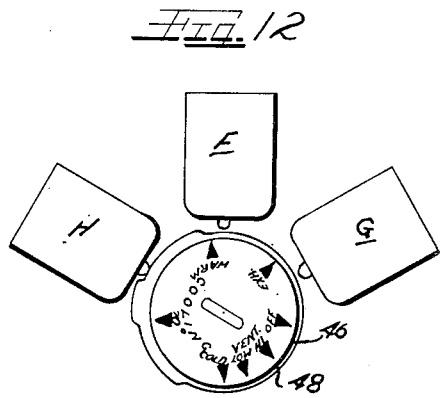
Figure 13:
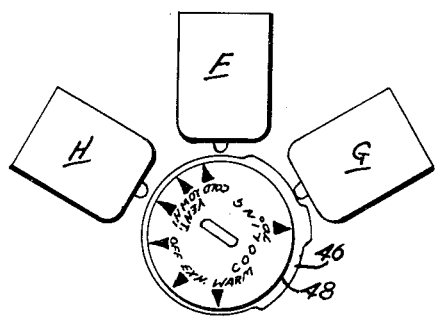

Figure 8, 9, 10, 11, and 12 are somewhat diagrammatic views, corresponding generally to Figures 1 through 5, but showing another preferred control means positioned to provide, respectively, the conditions of "off," "exhaust," "high ventilation," "low ventilation," and a low-temperature setting of a "cooling" condition;

Figure 13 is a view similar to Figure 12, but showing the parts in a relatively high setting of a "cooling" condition;

Figure 14 is a schematic diagram, generally corresponding to Figure 6 but showing the switch means of the embodiment of Figures 8 through 13;

Figure 15 is a table, generally corresponding to that shown in Figure 7, showing the condition of the various functional features and switch means of the embodiment shown in Figures 8 through 14.

For the purpose of disclosure, we have illustrated our invention in conjunction with a cabinet 20 of a room-type air conditioning unit. However, the present invention deals with the control system for regulating such a unit to provide the desired settings of its operative and functional components, and the cabinet is indicated diagrammatically only.

By our invention, we provide a control means for an air conditioning unit which is adapted to effect all the desired settings of the operating components by manipulation of a single control knob, and to provide such a control by a new and improved means which will be economical both with respect to manufacture and assembly, and which will give a generally fool-proof operation even when operated by a person having little or no mechanical aptitude.

Accordingly, a control knob 22 is carried by the cabinet 20 in a conveniently accessible location. The knob 22 is keyed to a control shaft 24 which carries a cam 26. Suitable lettering on the knob is provided to indicate the position of cam 26 by the position of the knob in reference to an indicator 27 carried by the cabinet.

The cam 26 may be of any desired material, such as Bakelite, or other hard plastic, for example, and the periphery 28 of cam 26 is contoured to provide a cam surface adapted to cammingly engage a plurality of switch means A, B, C, and D, the bodies of which are fixed with respect to the cabinet 20.

As indicated in Figure 6, the switches A, B, and C may be and desirably are identical in construction, and are shown as of a conventional single-throw double-pole double-break variety commercially available. Switch D may be a single-throw single-pole switch as shown.

The desired wiring arrangement for the switches A, B, C and D is indicated by the schematic diagram of Figure 6. As there shown, switches A, B, and C are connected in parallel to one line X of a conventional 115 volts electric circuit X—Y. Switches B, A, and C, carry parallel contacts B1 and B2, and A1 and A2, and C1 and C2, respectively. These pairs of contacts are adapted to be energized by switch blade contacts B3 and B4, A3 and A4, and C3 and C4, respectively, when their respective switches are operated by the cam 26. Closure of contact B1 effects a circuit through switch B through a wire B5 connected to the motor of a high-speed fan means 30. Contact B2 is connected through a wire B6 to a ventilating means such as the ventilation solenoid 32. Contact A1 is connected by a wire A5 to the motor of a low-speed fan means 34. Contact A2 is connected by a wire A6, in parallel with the wire B6, to the ventilation solenoid 32. Contact C1 is connected by a wire C5, in parallel with the wire B5, to the high-speed fan means 30. Contact C2 is connected by a wire C6 to an exhaust means such as the exhaust solenoid 36.

Switch means D is likewise actuatable by the cam 26, and is connected in parallel with switches A, B, and C, to the line X of the power source. Switch D is connected by a wire D1 in parallel with wires B5 and C5 to the high-speed fan means 30.

A temperature-responsive switch such as the switch means E is also provided to provide an automatic control for the cooling apparatus, such as a compressor 38 of the refrigerating equipment associated with the air conditioning unit. As shown, the switch E is connected in parallel with the cam-actuated switches A, B, C, and D. Means for blocking out the switch E except when the control is set to effect "cooling" are described hereinafter, but it may be noted here that the switch E is shown as being responsive to room temperature under the control of a temperature-responsive element such as the "Vernay" element 40 diagrammatically indicated. Such an element is of the so-called power or wax type which has a power member extensible from its body at a predetermined temperature, and contains a fusible thermally expansible material such as wax or wax embodied in a powdered heat conducting material and binder, such as is shown and described in Patent No. 2,259,846 which issued to Sergius Vernet on October 21, 1941. The element 40 is desirably generally of the type shown and described in the Vernet Patent No. 2,368,181, dated January 30, 1945, commonly referred to as a "Vernay" element.

The cam 26 having the peripheral outline or cam-surface 28 illustrated in Figures 1 through 5 is adapted to effect the desired conditions of operating features and of switch contacts as tabulated in Figure 7. Figure 7 tabulates these conditions in accordance with the various settings: "high ventilation," "low ventilation," "cooling," "exhaust," and "off," and thus indicates in convenient tabular form all the circuits shown in the schematic diagram of Figure 6.

Thus, as indicated by the tabulation in Fig. 7 and by the arrangement of parts shown in Figs. 1 and 6, in the "off" setting of the control knob 22 and cam 26 the circuits are as follows: switch B is open, thus preventing energization of the ventilation solenoid 32 through wire B6 and preventing energization of the high speed fan 30 through wire B5; switch A is open, thus preventing energization of the low speed fan 34 through wire A5, and preventing energization of the ventilation solenoid 32 through wire A6; switch C is open, thus preventing energization of the high speed fan 30 through wire C5, and preventing energization of the exhaust solenoid 36 through wire C6; switch D is open, thus preventing energization of the high speed fan 30 through wire D1; switch E is open, thus preventing energization of the compressor 38 of the cooling unit. Hence, in the "off" setting, none of the high speed fan 30, the low speed fan 34, the ventilation solenoid 32, the exhaust solenoid 36, and the compressor 38 is energized.

In the "exhaust" setting, as shown in Fig. 2, switches A, B and D are open, thus preventing energization of the ventilation solenoid 32 by either of wires B6 and A6, and also preventing energization of either of the fans 30 and 34 by any of wires B5, A5, and D1; switch C, however, is closed, thus energizing the high speed fan 30 through wire C5, and also energizing the exhaust solenoid 36 through wire C6; switch E is open, thus preventing energization of the compressor 38. Hence, in the "exhaust" setting, the high speed fan 30 is energized through wire C5; and the exhaust solenoid 36 is energized through wire C6; but the low speed fan 34, the ventilation solenoid 32, and the compressor 38 are not energized.

In the "high ventilation" setting, as indicated in Fig. 3, only switch B is closed. This energizes the high speed fan 30 through wire B5, and also energizes the ventilation solenoid 32 through wire B6. The other switches A, C, D, and E, are all open. Hence, in the "high ventilation" setting, the high speed fan 30 is energized through wire B5, and the ventilation solenoid 32 is energized through wire B6. The low speed fan 34, the exhaust solenoid 36, and the compressor 38 are not energized.

In the "low ventilation" setting, indicated by Fig. 4, only switch A is closed; and switches B, C, D, and E are open. Hence, in the "low ventilation" setting, the low speed fan 34 is energized through wire A5, and the ventilation solenoid 32 is energized through the wire A6; but the high speed fan 30, the exhaust solenoid 36, and the compressor 38 are not energized.

In the "cooling" setting, one position of which is shown in Fig. 5, switches D and E are closed, but switches A, B, and C are open. Hence, the high speed fan 30 is energized through the wire D1, and the compressor 38 is adapted to be energized through switch E. The means for rendering switch E operative for obtaining selected temperature levels within the cooling range will be described hereinafter.

As shown in Figures 8 to 15, another preferred embodiment the same control of the various air conditioning features is provided by merely three cam actuated switches F, G, and H and a single temperature-responsive switch I. In this embodiment, switches F, G, and H are responsive to the setting of a cam 46 manually operable by a control knob 48 in a manner similar to that of switches A, B, C, and D of the first embodiment.

Switch F is shown as of a dual action, or make-before-break, variety having contacts F1, F2, and F3, contact F1 being connected to line X' of a power source X'—Y'. A pair of contact bars F4 and F5 are arranged and actuatable in such a manner that the switch F will have three conditions or settings: contacts F2 and F3 connected, contacts F1 and F2 and F3 connected, and only contacts F1 and F3 connected. As shown, the switch means F is connected in series with each of the other switches G, H, and I; so it will be apparent that the operability of switches G, H and I depends on the setting of switch F.

Switches G and H may be simple double-throw switches as shown. A terminal G4 of switch G is connected to the terminal F2 of switch F, and a terminal H7 of switch H is connected to the terminal F3 of switch F. Contacts G5 and G6 of switch G are adapted to be alternatively interconnected with the contact G4 by a contact arm G' actuatable by the cam 46. Similarly, switch H has contacts H8 and H9 alternatively connectable with contact H7 by a contact arm H' which is actuatable by the cam 46.

The contacts G5 and G6 connect to a ventilation means such as the ventilation solenoid 32a and exhaust means such as the exhaust solenoid 36a, respectively. Thus the switch G energizes the means for effecting either the ventilation or the exhaust, depending upon what is called for by the setting of the control knob 48 and cam 46.

Similarly, the switch H, contacts H8 and H9 are connected respectively to the motor of the high-speed fan means 30a and to the motor of the low-speed fan means 34a. Thus the switch H serves to energize alternatively the high-speed fan or low-speed fan in accordance with the position of its contact arm H' as determined by the setting of the knob 48 and cam 46.

The temperature-responsive switch I is connected as by a wire 50 in parallel with contact H7 to contact F3 of switch F. This switch I, which is blocked by means hereinafter described except at a "cooling" setting, is shown as being temperature-responsive under the control of a temperature-responsive power element 40a like the "Vernay" element 40 described above, to move a contact arm I' into engagement with a contact I11 which is connected to the refrigerating means such as the compressor 38a associated with the air conditioning unit.

Each of switches F, G, and H is cam-controlled, with the cam peripheries as illustrated in the drawings being adapted to actuate the required switches to effect the desired operation tabulated in Figure 15.

Figure 8:
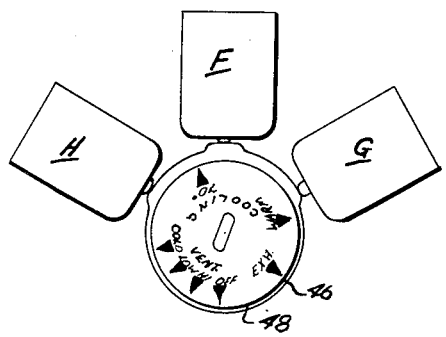

Thus, in the "off" setting shown in Fig. 8, tabulated in Fig. 15, and with the parts as shown diagrammatically in Fig. 14, switch F is in a setting such that only contacts F2 and F3 are closed, and contact F1 is out of contact with either of contacts F2 or F3. Hence, although contacts G4 and G5 are connected by arm G' of switch G, and contacts H7 and H8 of switch H are connected by arm H', neither of switches G or H are effective due to the break in the X' circuit at contact F1 of switch F. Since switch I, which governs the compressor 38a, is also connected in series with contact F3, switch I is also non-energized. Hence, in the "off" setting, the high speed fan 30a, the low speed fan 34a, the ventilation solenoid 32a, the exhaust solenoid 36a, and the compressor 38a, are all non-energized.

Figure 9:
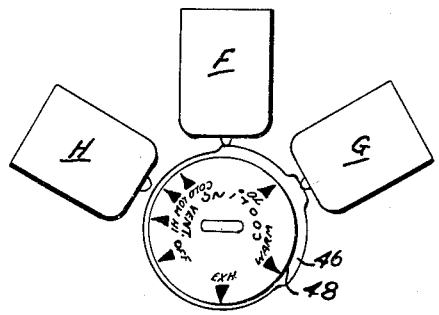

In the "exhaust" setting, as indicated in Fig. 9, the contact arms F4 and F5 of switch F interconnect contact F1 with both of contacts F2 and F3; switch G is set so that its contacts G4 and G6 are connected by arm G'; switch H is set such that its contacts H7 and H8 are connected by arm H'; and switch I is an open condition in which its contact arm I' is out of contact with contact I11. Hence, in the "exhaust" setting, the high speed fan 30a is energized by a circuit comprising X', F1, F4, F3, H7, H', and H8; and exhaust solenoid 36a is energized through a circuit comprising X', F1, F4, F2, G4, G', and G6. The low speed fan 34a, the ventilation solenoid 32a, and the compressor 38a are all non-energized due to the setting of their contact arms G', H' and I', respectively.

Figure 10:
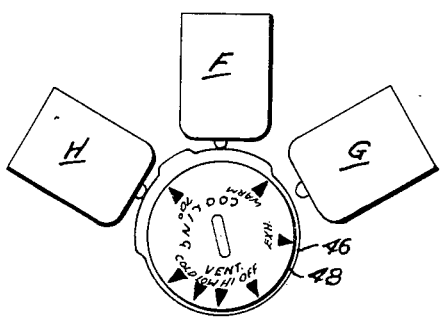

In the "high-ventilation" setting, shown in Fig. 10, both of contact F2 and F3 of switch F are connected with contact F1 as before, and as before the arm H' of switch H connects contact H7 and H8 to energize the high speed fan 30a, but here the arm G' of switch G connects G4 with contact G5 to actuate the ventilation solenoid 32a.

Figure 11:
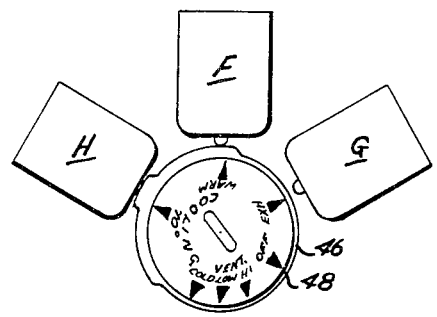

In the "low ventilation" setting, shown in Fig. 11, switch F contacts F1, F2, and F3 are interconnected, and switch G contacts G4 and G5 are interconnected, thus energizing ventilation solenoid 32a; but the contact arm H' of switch H has now moved to connect contact H7 with contact H9, thus energizing the low speed fan 34a.

In settings in the "cooling" range, two positions of which are indicated in Figs. 12 and 13, respectively, switch F is set to interconnect contact F1 with contact F3 only, thus opening any circuit through the switch G and accordingly preventing the energization of either the ventilation solenoid 32a or the exhaust solenoid 36a. The contact arm H' of switch H is set to interconnect the contact H7 with the contact H8, thus energizing the high speed fan 30a. As the contact I-10 of the compressor-controlling switch I is connected in parallel with switch H to contact F3 of switch F, switch I is adapted to actuate the compressor 38a to maintain a desired temperature level, as controlled by means now to be described.

Both embodiments desirably provide for automatic control of the operation of cooling means 38—38a, to maintain a room temperature at any of various desired levels while the control knobs 22—48 are positioned to effect "cooling" operation. Thus, knob 22 of the first-described embodiment and knob 48 of the second-described embodiment have angularly spaced indicia "warm," "70°," and "cold," and these knobs are adapted to be set at various positions throughout the "cooling" range. It should be noted that the cams 26 and 46 associated with knobs 22 and 48, respectively, effect no changes in the switches A, B, C, or D, nor in switches F, G, or H, during the range of movement of the control knobs throughout that whole range of "cooling" settings. However, suitable actuation and temperature adjustment means (not shown), which are responsive to various settings of the control knobs 22—48 within that range, are desirably provided to render operative the temperature responsive elements 40—40a and adjust their operability to provide that they will close switches E and I, respectively, at the proper room temperature to effect maintenance of the particular temperature of "cooling" selected by the user and to which he has adjusted the control knob. Such actuation and temperature adjustment means may be of the form shown and described in the copending application of Samuel G. Eskin, Serial No. 493,258, filed March 9, 1955, now Patent No. 2,758,177.

Thus it will be seen from the foregoing description of our invention according to two preferred embodiments, considered in conjunction with the accompanying drawings, that the present invention provides a new and improved control means and arrangement for effecting the desired control of an air conditioning unit. It possesses desired advantages and characteristics, and accomplishes its intended objects, including those hereinbefore pointed out and others which are inherent in the invention as described. The arrangement is simple and economical in its production, assembly, and operation, and it provides that a single control knob may effect all the various desired settings to provide the desired operation for maximum comfort.

It will be apparent that modification and variations may be effected without departing from the scope of the novel concepts of the present invention.

We claim as our invention:

1. Control means for an air conditioning system which has fan means, ventilating means admitting ventilating air through said system, exhaust means providing exhaust by said system, and cooling means for cooling air passing through said system; comprising switch means operable by a single control member and adapted to energize said fan means, said ventilating means, and said exhaust means; and a thermal element powered switch means adjustable by said single control member to set the operating temperature thereof and responsive to the temperature of the room being conditioned to establish a circuit adapted to energize said cooling means.

2. Control means for an air conditioning system which has fan means, ventilating means for admitting ventilating air through said system, exhaust means providing exhaust by said system, and cooling means for cooling air passing through said system, comprising a first electrical switch means, a second electrical switch means adapted to selectively interconnect said first switch means with said ventilating means and with said exhaust means, a third switch means adjustably operative in response to temperature in the room being conditioned by said system and adapted to establish a circuit through said first switch means and said cooling means, and a single control member for operating said first and second electrical switch means and for adjusting the operating temperature of said third switch means.

3. Control means for an air conditioning system which has a pair of main line conductors, relatively low speed fan means and relatively high speed fan means, ventilating means for admitting ventilating air through said system, exhaust means providing exhaust by said system, and cooling means for cooling air passing through said system; comprising a first electrical switch means; a circuit operatively connected to said first switch means and including a second electrical switch means in said circuit for selectively interconnecting said first switch means with said ventilating means and with said exhaust means; another circuit operatively connected to said first switch means and including a third electrical switch means in said other circuit adapted to selectively interconnect said first switch means with said relatively high speed fan means and with said relatively low speed fan means; said first switch means being operatively connected to one of said main line conductors and adapted to connect said conductor with one or both said circuits to energize said second and third switch means; a fourth switch means adjustably operative in response to temperature of the air in the room being conditioned by said system and adapted to establish a circuit through said first switch means and the said cooling means; and a single control member adapted to actuate said first switch means, said second switch means, and said third switch means and to selectively adjust the operating temperature of said fourth switch means to effect the operation specified.

4. Control means for an air conditioning system which has relatively low speed fan means and relatively high speed fan means, ventilating means for admitting ventilating air through said system, exhaust means providing exhaust by said system, and cooling means for cooling air passing through said system; comprising a circuit and switch means for energizing said high-speed fan means and said ventilation means, a circuit and switch means for energizing said low-speed fan means and said ventilation means, a circuit and switch means for energizing said high speed fan means and said cooling means, a circuit and switch means for energizing said exhaust means and one of said fan means, temperature responsive means adapted to prevent the energization of said cooling means except when the room being conditioned has attained a predetermined temperature, and a single manually operable control operable to selectively actuate said circuit and switch means and operatively connected with said temperature responsive means to adjust said temperature responsive means to effect the energization of said cooling means at a preselected temperature without affecting said switch means when said control is in a cooling position.

5. Control means for an air conditioning system which has fan means, ventilation means for admitting ventilating air through said system, exhaust means providing exhaust by said system, and cooling means for cooling air passing through said system; comprising a first switch means adapted when closed to establish a circuit adapted to energize said fan means and said ventilation means; a second switch means adapted when closed to establish a circuit adapted to energize said fan means and said exhaust means; and a third switch means adapted when closed to establish a circuit adapted to energize said fan means; and a single manually operable control member selectively operable to operate all of said switch means to effect their selective actuation; a temperature responsive switch means adapted when closed to establish a circuit adapted to energize said cooling means, and an adjustable connection between said single control member and said temperature responsive switch means for adjusting the operating temperature of said switch means to energize said cooling means at a preselected temperature without affecting said other switch means when said control member is in a cooling position.

References Cited in the file of this patent
UNITED STATES PATENTS

| | | |
|---|---|---|
| 2,343,121 | Eberhart | Feb. 29, 1944 |
| 2,711,087 | Jennings | June 21, 1955 |
| 2,711,088 | Hess | June 21, 1955 |
| 2,715,324 | Rose et al. | Aug. 16, 1955 |
| 2,720,090 | Ford | Oct. 11, 1955 |